(12) United States Patent
Ariyoshi et al.

(10) Patent No.: US 8,194,190 B2
(45) Date of Patent: Jun. 5, 2012

(54) REMOTE CONTROLLER

(75) Inventors: Masayasu Ariyoshi, Tokyo (JP); Hitoshi Sakaguchi, Tokyo (JP); Takeru Komoriya, Tokyo (JP)

(73) Assignee: PTP, Inc., Tokyo (JP)

( * ) Notice: Subject to any disclaimer, the term of this patent is extended or adjusted under 35 U.S.C. 154(b) by 1141 days.

(21) Appl. No.: 11/576,245

(22) PCT Filed: Sep. 28, 2005

(86) PCT No.: PCT/JP2005/017901
§ 371 (c)(1),
(2), (4) Date: Mar. 28, 2007

(87) PCT Pub. No.: WO2006/035849
PCT Pub. Date: Apr. 6, 2006

(65) Prior Publication Data
US 2008/0068513 A1    Mar. 20, 2008

(30) Foreign Application Priority Data
Sep. 28, 2004   (JP) .................................. 2004-282667

(51) Int. Cl.
*H04N 5/44* (2006.01)
*H04N 7/16* (2006.01)

(52) U.S. Cl. .......................... 348/734; 386/296; 386/297

(58) Field of Classification Search ................... 386/83, 386/296, 297; 348/734, 569, 565, 588; 725/38, 725/39, 58
See application file for complete search history.

(56) References Cited

U.S. PATENT DOCUMENTS

| | | | | |
|---|---|---|---|---|
| 4,866,542 A * | 9/1989 | Shimada et al. | ............ | 386/234 |
| 5,047,867 A * | 9/1991 | Strubbe et al. | ............ | 386/291 |
| 6,243,324 B1 * | 6/2001 | Teng | ............ | 368/21 |
| 6,819,864 B2 * | 11/2004 | Fujita et al. | ............ | 386/230 |
| 7,734,680 B1 * | 6/2010 | Kurapati et al. | ............ | 709/203 |
| 7,904,924 B1 * | 3/2011 | de Heer et al. | ............ | 725/46 |
| 2002/0029385 A1 * | 3/2002 | Moir | ............ | 725/53 |
| 2002/0049972 A1 | 4/2002 | Kimoto | | |
| 2002/0144273 A1 * | 10/2002 | Reto | ............ | 725/86 |
| 2003/0070168 A1 * | 4/2003 | Stone | ............ | 725/37 |

(Continued)

FOREIGN PATENT DOCUMENTS
EP    0 933933 A1    8/1999

(Continued)

*Primary Examiner* — Victor Kostak
(74) *Attorney, Agent, or Firm* — Michael A. Glenn; Glenn Patent Group

(57) ABSTRACT

There is provided a remote controller facilitating the operation concerning reproduction of recorded program data and having a user-friendly function. The remote controller (50) transmits an operation signal of a digital recording/reproducing device (10) which has recorded television programs. The remote controller (50) includes a power button (60) for turning on/off power of a TV for displaying the output data of the digital recording/reproducing device (10) and a reproduction button (80) for reproducing program data. The reproduction button (80) includes: a first operation unit (81) which has time marks from 1 o'clock to 24 o'clock and can be rotated rightward and leftward; a second operation unit (82) which is formed on the first operation unit (81) with a smaller size than the outer diameter of the first operation unit (81),has time marks from Sunday to Saturday and can be rotated rightward and leftward; and a reproduction decision unit (83) formed on the second operation unit (82) with a smaller size than the outer diameter of the second operation unit (82) for deciding the day-of-week mark and the time mark specified by the first operation unit (81) and the second operation unit (82).

12 Claims, 11 Drawing Sheets

U.S. PATENT DOCUMENTS

| | | | |
|---|---|---|---|
| 2003/0231864 A1* | 12/2003 | Wakahara | 386/68 |
| 2004/0117831 A1* | 6/2004 | Ellis et al. | 725/53 |
| 2006/0174275 A1* | 8/2006 | Gutta | 725/46 |

FOREIGN PATENT DOCUMENTS

| | | | |
|---|---|---|---|
| JP | 61-170020 U | 10/1986 | |
| JP | 2-148496 U | 12/1990 | |
| JP | 5-57989 U | 7/1993 | |
| JP | 8-255171 A | 10/1996 | |
| JP | 11-69253 A | 3/1999 | |
| JP | 11-69254 A | 3/1999 | |
| JP | 2001-145087 | 5/2001 | |
| JP | 2001-324974 A | 11/2001 | |
| JP | 2003-9047 A | 1/2003 | |
| JP | 2003-78779 A | 3/2003 | |
| WO | WO 99/11059 A | 3/2009 | |

* cited by examiner

User 2    Menu of program

| Time | Channel | Name of program |
|---|---|---|
| 18:00 ～ 21:00 | 4 | Pro baseball game all-ster 1st. East team vs West team |
| 19:00 ～ 21:00 | 10 | XX Olympic foot ball game Japan vs Italy |
| 22:00 ～ 22:30 | 8 | Pro baseball game News digest edition |
| 23:00 ～ 24:00 | 12 | World News |
| 23:00 ～ 23:50 | 1 | Sports 23 |
| 23:30 ～ 01:30 | 6 | Volleyball game women's  Japan vs Greece |
| ⋮ | ⋮ | ⋮ |

Fig. 4

| 2004/MM/DD Monday | 1ch | 3ch | 4ch | 6ch | 8ch | 10ch | 12ch | BS/CS |
|---|---|---|---|---|---|---|---|---|
| 20:00 ~ 21:00 | ⋮ | ⋮ | ⋮ | ⋮ | ⋮ | ⋮ | ⋮ | ⋮ |
| 21:00 ~ 22:00 | News | Cooking Program | Variety show | Quiz show | Teleplay | Music Progaram | Movie Program | Sports Progaram |
| 22:00 ~ 23:00 | ⋮ | ⋮ | ⋮ | ⋮ | ⋮ | ⋮ | ⋮ | ⋮ |

Fig. 5

Four dimension warp menu

|  | 18 o'clock | 19 o'clock | 20 o'clock | 21 o'clock | 22 o'clock | 23 o'clock |
|---|---|---|---|---|---|---|
| Monday, 7 days before | | | | | | |
| Tuesday, 6 day before | | | | | | |
| Wednesday, 5 days before | | | | | | |
| Thursday, 4 days before | | | | | | |
| Friday, 3 days before | | | | | | |
| Saturday, 2 days before | | | | | | |

10 min. / 15 min. / 20 min. / 30 min. / 35 min. / 40 min.

Fig. 11

REMOTE CONTROLLER

FIELD OF THE INVENTION

The present invention relates to a remote controller by which a digital recording/reproducing device can be remote-controlled, and in particular, relates to a technology for improving convenience when viewing recorded program data.

BACKGROUND OF THE INVENTION

In recent years, as means for recording TV program data of broadcasting such as a ground wave and a satellite broadcasting (hereinafter, referred to as "program data"), a hard disk recorder which records program data to a storage medium such as a hard disk drive has becoming popular. A digital recording/reproducing device for recording digital data converted from analog data has been prevailing, from magnet tape where analog data is recorded as a recording media of program data.

Particularly, a hard disk recorder equipped with an EPG, an iEPG and others (hereinafter, referred to as "electronic program list") is very popular among users because a recording reservation with a few operations is much easier compared to the other digital recording/reproducing devices.

In addition, if time to be recorded is fixed, it can have functions such as an every-week automatic recording function dispensing with user's efforts of reserving recording of a serial drama broadcasted every week or so.

Furthermore, capacity of a hard disk drive has been enlarged, so that a large number of program data can be recorded and stored (for, instance, refer to Japanese Patent Laid Open No. 2003-9047).

Patent Reference: Japanese Patent Laid Open No. 2003-9047

The technology described in Japanese Patent Laid Open No. 2003-9047 is a TV program recording system, in which a reserved program can be recorded precisely when the reservation recording of TV program is performed using a network, even if the program broadcasting time is suddenly altered or extended.

That is to say, according to the TV program recording system, the program information center stores program broadcasting information sent out from the broadcasting station which is always renewed in real time; recording start/end commands of the program whose recording was requested are sent to the information processing device of the source which requested the recording, via a communication network based on the stored program broadcasting information, by which the information processing device conducts starting of a VTR and controlling of program recording.

DISCLOSURE OF THE INVENTION

Problems to be solved by the Invention

On the other hand, even though recording and reservation become easy by employing the electronic program list, users still have to take steps for reserving and recording TV programs. And a baseball game broadcasted by a different broadcasting station does not entirely correspond to the game set by the every-week automatic recording function. Therefore, recording error occurs, if the baseball broadcast is extended or break-in news is broadcasted.

If the technology described in Japanese Patent Laid Open No. 2003-9047 is used, the reserved program can be recorded accurately even though suddenly the time of program broadcasting changes or the program broadcasting is extended. However, extra equipment for renewing the program information in real time is needed, which causes a higher cost. Therefore, a technology which can deal with troubles concerning recording reservation of TV programs and recording errors has been desired.

In the case of a conventional VCR or a hard disk recorder, if a user tries to view recorded program data while viewing programs being broadcasted, the user must switch TV screen from the present one where the program is displayed to a top menu screen where programs are displayed for navigation. The user may select program data from the top menu screen and view them.

In other words, to view the program recorded in the hard disk, the user must shift screens from a TV screen to a program data selection screen. Viewing a plurality of program data, the user must switch the screen between the TV screen and the top menu screen.

Therefore, it has been desired that such switching screens is unnecessary or the operation by the user is simplified.

In general, the various kinds of operations depend on sorts of buttons provided in a main body of a hard disk recorder. Besides, a remote controller is used to enable operation at a position remote from the main body of the hard disk recorder.

However, at present, a technology for solving the above problems does not exist. In particular there is no such remote controller which can access desired target program data on the hard disk recorder with complicated functions. Therefore, a remote controller with excellent convenience has been desired.

The problem to be solved by the present invention is to provide a remote controller for enabling to simplify an operation for reproducing the recorded program data for the digital recording/reproducing device which may accommodate recording errors.

Means for Solving the Problems

The invention provides a remote controller (50) for sending a remote signal relating to recording/reproducing of program data to a digital recording/reproducing device (10) always recording the program data of TV program. That is to say, the present invention relates to a remote controller provided with;

a recommendation button configured for sending program data which a user wishes to recommend to another user, a previous list/next list button configured for sending a command of reproducing the program data to the digital recording/reproducing device wherein when the program data is selected from a list in which the recorded program data are rated and listed in a predetermined form, program data rated immediately below or above the rate of said selected program data are reproduced after the present program data is viewed without changing screens.

Also the invention relates to a remote controller provided with;

a power supply button (60) for sending input signals related to -on/off of a power supply of a display for displaying output data of the digital recording/reproducing device (10), and a program data reproducing button (80) for reproducing the program data, wherein the program data reproducing button (80) comprises a first operation unit (81) which can rotate in right and left directions, on the face of whose board formed like a disk time marks of 1 to 24 o'clock are disposed;

a second operation unit (82) which can rotate in right and left directions, whose outer diameter is formed smaller than one of the first operation unit, on the face of whose board formed like a disk time marks of Sunday-Saturday are disposed; and a reproducing determination unit (83) disposed on the second operation unit (82), whose outer diameter is formed smaller than one of the second operation unit (82), for determining day and time data based on the day-of-the-week-marks and the time marks designated by the first operation unit (82) and the second operation unit (82), and for sending a reproducing signal to the digital recording reproducing device (10).

(Term Description)

An "always recording" stands for a function that a digital recording/reproducing device automatically records program data under state where the user does not set a recording operation. That is to say, the digital recording/reproducing device continues recording all of the program data corresponding to a tuner of the digital recording/reproducing device unless any physical limitation such as shortage of storage capacity of the storage device (typically, a HDD) in the digital recording/reproducing device occurs.

If the digital recording/reproducing device comprises the same number of tuners as one of broadcasting stations, the user does not need to designate the tuner.

"A remote signal" is the general term of input signals sent to a digital recording/reproducing device from a remote controller, for which infrared light is used.

"A display" generally stands for a screen of TV with which the digital recording/reproducing device is connected.

"A program data reproducing" stands for reproducing program data (digital data) recorded on a storage device of the digital recording/reproducing device.

"Time marks" stands for marks displaying times in 24-hour from 1 o'clock to 24 o'clock. Adding day-of-the-week-marks to the time marks and setting time to the desired time make it possible to view program data. In addition, the time marks may be a 12-hour time display from 1 o'clock to 12 o'clock. In this case, an operation unit to distinguish AM and PM should be provided.

"A program data reproducing button" stands for a so-called analog device which requires physical operations such as pushing, twisting and moving. As for the remote controller, a display device (a liquid crystal display) where operations are displayed may be omitted.

For instance, while reproducing the $5^{th}$ rated program data among the rated program data with the high audience rating in a week, a user may reproduce the $4^{th}$ rated program by pushing the next list button without changing screens, and reproduce the $6^{th}$ rated program by pushing the previous list button without changing screens.

That is, the user may view the rated and listed program data in turn without returning to the top menu, which results in remarkable improvement of convenience and operability when using the digital recording/reproducing device. In addition, there is provided with storing area of rating lists storing information from which ratings or lists the present rating list being reproduced is selected.

The other user may easily view favorite programs and programs which the user wishes to recommend to other users by pushing the recommendation button. Also on the contrary, the user may select and view the program recommended by other users.

In an embodiment, each user may evaluate each program by an evaluation button such as a "good or no-good" button provided separately for the program so that evaluation can be improved.

When the power supply button (60) of the remote controller (50) is pushed, the on/off input signal of the power supply of the display is sent. When the program data reproducing button (80) is pushed, the program data recorded by the digital recording/reproducing device (10) are reproduced. The user rotates the first operation unit (81) in left and right directions to set the time marks disposed in the first operation unit (81) to a desired time, and rotates the second operation unit (82) in left and right directions to set the day-of-the-week-marks disposed in the second operation unit (82) to a desired day, and determines the reproducing determination unit (83), by which the remote signal is sent to the digital recording/reproducing device (10).

The digital recording/reproducing device of the present invention provides a function for recording regularly the program data, so that a program not reserved for recording can be viewed. For instance, a baseball broadcast of a previous day can be viewed even if it was not reserved for recording.

The user of the remote controller (50) may reproduce program data by rotating the first operation unit and the second operation unit and setting to a desired day and time. Therefore, the operation for reproducing recorded program data may be simplified.

The invention provides the remote controller (50) for sending-remote signals relating to recording/reproducing of program data to a digital recording/reproducing device (10) always recording the program data of TV program. That is to say, the remote controller comprises a power supply button (60) for sending input signals related to on/off of a power supply of a display for displaying output data of the digital recording/reproducing device (10), and a program data reproducing button (80) for reproducing the program data. The program data reproducing button (80) comprises:

a first operation unit (81) which can rotate in right and left directions, on the face of whose board formed like a disk day-of-the-week-marks of Sunday-Saturday are disposed;

a second operation unit (82) which can rotate in right and left directions, disposed on the first operation unit (81) being formed smaller than an outer diameter of the first operation unit (81), time marks from 1 o'clock to 12 o'clock disposed on a face of a board formed in a disk shape; and a reproducing determination unit (83) disposed on the second operation unit (82), whose outer diameter is formed smaller than one of the second operation unit (82), for determining day and time data based on the day-of-the-week-marks and the time marks designated by the first operation unit and the second operation unit, and for sending a reproducing signal to the digital recording reproducing device (10).

In case the time marks are the 12-hour display, it is desirable to provide an operation unit for distinguishing AM and PM.

The invention provided with a plurality of the power supply buttons (60) which can send on/off input signals of the power supply to the display, and send different signals to the digital recording/reproducing device (10) depending upon each of the power supply buttons (60).

The plurality of power supply buttons (60) are provided for multiple use of one digital recording/reproducing device by a plurality of users, where each of the power supply buttons (60) is assigned for each user. Here, "plurality" means a number of 2(e.g. for an adult and a child) at minimum and to the number of a standard family member (3 to 5). For professional use, such number will be more than 5.

In the main power supply button in the previous case or one power supply button in the latter case, if on/off input signals of the power supply in a display of the television connected to the digital recording/reproducing device (10) is sent, and at the same time an input signal is also sent to the digital recording/reproducing device, different input signals may be sent to 2 hardware with 1 button operation.

When each of the power supply buttons (60) is assigned to each of the users, databases for a storage device of the digital recording/reproducing device are formed for each of the users. If various setting registration is available in the database, each of the users may customize the digital recording/reproducing device by using them.

The remote controllers comprises a plurality of menu buttons (65) which send selecting signals of the program data displayed on the top menu screen, when the program data recorded on the digital recording/reproducing device (10) to be a target for reproducing is displayed on the top menu screen of the display, by which a plurality of menu buttons can be assigned to a plurality of users using the digital recording/reproducing device (10).

As a countermeasure for using one digital recording/reproducing device with the plurality of users, a plurality of power supply buttons are provided physically. In the invention, a plurality of menu buttons (65) is provided.

Users using the digital recording/reproducing device to each of the plurality of menu buttons are assigned. Furthermore, for instance, data for specifying favorite program data in the top menu screen in advance are registered.

Each of the users may access the top menu screen customized exclusively for himself/herself by pushing a menu button registered for exclusive use of oneself. This may improve convenience such as simplification of operation orders when reproducing the program data. Or it may make other users difficult to use it, which may improve convenience when a plurality of users use the digital recording/reproducing device as a television recording device shared by family members.

The digital recording/reproducing device (10) comprises exclusively storing recording means (a secondary recording device) physically different from the recording device (a primary recording device) always recording the program data of the TV program, and the remote controller comprises the program data storage button (70) for sending a command to store the program data of the TV program recorded on the recording device into the exclusively storing recording means to the digital recording/reproducing device.

Given program data are stored in the exclusive recording means provided as storage area different from the recording means. Hereby, it is prevented that important data are deleted by mistake. Or, the important data are isolated from deleting target in "automatic deleting function of the oldest data".

When the program data storing button is pushed, the program data recorded in the primary recording device is stored in the secondary recording device. The primary recording device is a recording device exclusively used for full-time recording to record regularly the program data of the TV program. The secondary recording device is a recording device used for storing, editing animation, etc.

That is, the program data storage button is a button for executing storing command of the program data which is storing function of the digital recording/reproducing device provided with the full-time recording function.

The invention comprises a next program button for sending a command of reproducing the program data to the digital recording/reproducing device without changing screens, said program data being the program data of the same channel as one of the recorded program data which a user is viewing and had been recorded immediately after said recorded program data was actually broadcasted.

For instance, if a user pushes the next program button 90 while viewing an animation program broadcasted from 19:00, the animation program recorded from 19:00 to 20:00 will be changed to a drama recorded from 20:00 to 21:00. This change of program data is performed per a program data unit such as an animation and a drama and per a program section unit in the program data, and such program data are reproduced without switching screens. In addition, when the next program button is pushed twice, another program data recorded between 21:00 and 22:00 will be displayed.

In the prior art, when a user tries to view the recorded program data, the TV screen where the program data is being shown generally changes to a layered menu screen for selecting desired program data. Then, if the program data is selected, the screen again returns to the TV screen. That is, when once selected, if the user wishes to view other program data, the screen needs to change to the layered menu screen again, which causes occurrence of switching screens. The button of the invention is the button to send control signals for realizing that such switching screens is unnecessary. Therefore, the next program button makes it possible to reproduce program data per program data and program section, which results in improvement of the user's convenience.

The invention comprises a previous program button for sending a command of reproducing the program data to the digital recording/reproducing device without changing screens, said program data being the program data of the same channel as one of the recorded program data which a user is viewing and had been recorded immediately before said recorded program data was actually broadcasted.

"The previous program button" is the button to command an action opposite to one of "the next program button" in a time direction to the digital recording/reproducing device.

If the previous program button is pushed, it becomes possible to reproduce the previous program data which had been broadcasted immediately before the present program data being broadcasted on the actual broadcasting date of the present program data and in the same channel as one thereof without changing screens. Therefore, it becomes possible to change the present program being reproduced to the previous program without changing screens, which results in improvement of convenience.

The invention comprises a channel switching button for sending a command of reproducing the program data to the digital recording/reproducing device without changing screens, said program data being the program data of the channel different from one of the recorded program data which a user is viewing and had been recorded at the same time as said recorded program data.

For instance, if a user pushes the channel switching button while reproducing the recorded news program broadcasted on "the 10th day, 18:00, 4 channel", a cooking program broadcasted on "the 10th day, 18:00, 4 channel" will be reproduced without changing screens. That is, programs which had been broadcasted at different broadcasting stations and recorded at the same time can be changed, which results in improvement of user's convenience when viewing program data.

The invention comprises a viewing-from-start-button (100) by which the program data being viewed can be returned to the top thereof.

If the user pushes the viewing-from-start-button, the program data are reproduced from the top of one recorded by the digital recording/reproducing device. That is, the program broadcasted in real time is the program data which have been recorded or are being recorded by the digital recording/reproducing device. Therefore, the user can return to the top of the program data while viewing the program data.

In the prior art, the user must take steps consisting of 1) displaying the recorded program list from the top menu screen, 2) selecting the present program being recorded from the program list, and 3) selecting the chase reproducing from an OSD menu which appears, overlapped with image on the screen by pushing the menu. On the other hand, in the present invention, the user pushes the viewing-from-start-button only once, by which the user can return to the top of the program, causing improvement of user's convenience.

The invention comprises a randomly reproducing button (97) for sending a command to reproduce each user's favorite program data randomly selected from the recorded program data accumulated in the individual viewing data storage unit, to the digital recording/reproducing device.

The randomly reproducing button is a button for sending a random reproducing function of the program data, by which each user's favorite program data may be reproduced at random from the individual viewing data storage unit. Because program data randomly selected from the favorite program data are reproduced, the user can enjoy the program data even if any program data is being reproduced.

The invention comprises a plurality of remote controllers which can respectively send remote control signals relating to the recording/reproducing of the program data to one of the digital recording/reproducing devices.

Depend on a user's request for using the digital recording device, the number of remote controllers may be selected. That is to say, if 4 remote controllers are provided for a family with 4 members, it will be very convenient. That is, each member may customize the top menu for one self's use to the digital recording/reproducing device as an operation target.

Effect of the Invention

The inventions may provide remote controllers by which the user can easily reproduce recorded program data.

BRIEF DESCRIPTION OF THE DRAWINGS

FIG. 3(a) is a plane view, and FIG. 3(b) is a side view.

FIG. 4 is a diagram showing a TV program selection menu displayed as an individual viewing data of the user.

FIG. 5 is a diagram showing electronic program table displayed at the time of operating the program data reproducing button.

FIG. 11 is a diagram showing one example of the operation method.

EXPLANATION OF SIGNS

Figure 1:
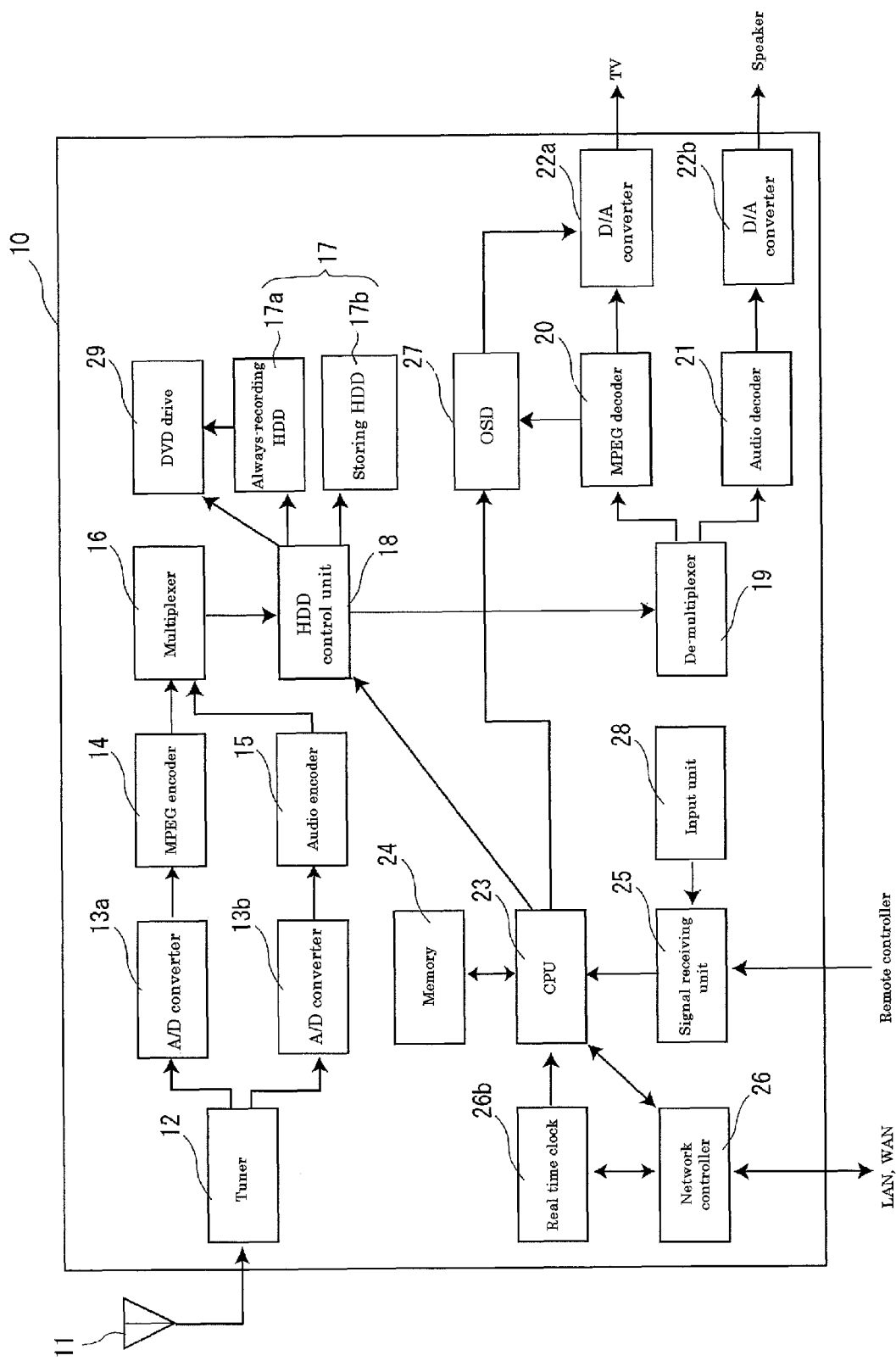
FIG. 1 is a block diagram showing a hardware configuration of the digital recording/reproducing device.

| | | | |
|---|---|---|---|
| 10: | digital recording/reproducing device | 11: | antenna |
| 12: | tuner | 13a, 13b: | A/D converter |
| 14: | MPEG encoder | 15: | audio encoder |
| 16: | multiplexer | 17: | HDD |
| 17a: | always recording HDD | 17b: | storing HDD |
| 18: | HDD control unit | 19: | de-multiplexer |
| 20: | MPEG decoder | 21: | audio decoder |
| 22: | D/A converter | 23: | CPU |
| 24: | memory | 25: | signal receiving unit |
| 26: | network controller | 26b: | real time clock |
| 27: | OSD | 28: | input unit |
| 29: | DVD drive | 50: | remote controller |
| 60: | power supply button | 65: | menu button |
| 70: | program data storage button | 80: | program data reproducing button |
| 81: | periphery dial | 82: | internal circumference dial |
| 83: | determination button | 84: | day determination unit |
| 85: | time determination unit | 87: | AM/PM button |
| 90: | next program button | 91: | previous program button |
| 92: | hannel-switching-at-the-time-of-past-button | | |
| 93: | previous list button | 94: | next list button |
| 95: | recommendation button | 96: | evaluation button |
| 100: | viewing-from-start-button | 110a, 110b: | channel button |

BEST MODE FOR PERFORMING THE INVENTION

The digital recording/reproducing device 10 of the present invention is equipped with an always recording function, but has no function that the user performs recording of the TV program. That is, the TV program of broadcasting stations corresponding to the tuner is being always recorded. The "always recording" stands for a function in which the digital recording/reproducing device records the program data automatically without setting a recording operation by the user. At first, the digital recording/reproducing device to which control signals of the remote controller is sent will be explained.

(Digital Recording and Reproducing Device)

The digital recording/reproducing device 10 comprises an antenna 11 for receiving television signal waveforms; a plurality of tuners 12 for selecting the waveform of the channel designated by the user from the waveforms received by the antenna 11, and demodulating it into the analog television signal; an A/D converter 13a, 13b for converting the analog signal from the plurality of tuners 12 respectively into digital image and audio signals; an MPEG encoder 14 for receiving the image signal among the digital signals converted by an A/D converter 13a and 13b; an audio encoder 15 for receiving sound signals; and a multiplexer 16 for receiving the image signal and the sound signal which are compressed and encoded by the MPEG encoder 14 and the audio encoder 15, multiplexing the compressed and encoded streams, and converting them into the MPEG system stream.

Furthermore, the digital recording/reproducing device 10 comprises: a plurality of randomly accessible hard disk drives 17 (17a, 17b) (referred to as "HDD", hereinafter); a HDD control unit 18 for recording data, reading data and performing various controls for the HDD 17; a de-multiplexer 19 for separating MPEG streams read out from the HDD 17 into image signal streams and sound signal streams; an MPEG decoder 20 for receiving image signal streams; an audio decoder 21 for receiving the sound signal stream; a digital-analog (D/A) converter 22a for receiving the image signal stream decoded by the MPEG decoder 20, converting the received image signal into the analog signal, and outputting it into a TV; and a D/A converter 22b for receiving the sound signal stream decoded by the audio decoder 21, converting the received sound signal into the analog signal and outputting it into a speaker and such.

The digital recording/reproducing device 10 is further provided with: a CPU 23 for controlling the entire digital recording/reproducing device 10; a memory 24 used as a working area for storing temporarily data in the working area the CPU 23 and the system stream, and recording them on the HDD 17; a receiving unit 25 for receiving various input signals from an input unit 28 of the main body in the remote controller and digital recording/reproducing device, and sending the input signal into the CPU 23; a network controller 26 (a communication means) connected with a LAN and a WAN which can perform Internet communication; a real time clock 26b for accessing to a server using an NTP (Network Time Protocol) of the network controller 26, inquire the present time and synchronizing time data; an OSD (On Screen Display) 27 for keeping to display a reproducing display even when an input signal of command to display the top menu screen is sent while the program data being reproduced or edited, and the top menu being displayed, and displaying the top menu screen such that it is overlapped on the menu while the menu display being displayed; and a DVD drive 29 for recording the recorded program data on the optical disk (a recording means) such as a DVD.

The network controller 26 is connected to the Internet via LAN and WAN, enabling data transmission and reception with servers on the Internet. As the main functions, it is at least possible to receive the program data by an EPG, to receive the program configuration data and a time index, to transmit the user's view data, and to receive date data and time data using a NTP (Network Time Protocol).

(Tuner)

Since the tuner 12 comprises 8 tuners, it is possible to browse and record 8 TV programs at maximum.

For instance, in addition to 1, 3, 4, 6, 8, 10, 12 channels, broadcasting stations of a satellite broadcasting such as a BS or a CS may be covered. As an example, the tuner 12 comprises 1 tuner board where 8 tuners are installed and 2 encoder boards where encoders enabling to process 4 image signals at the same time are installed.

Alternatively, the following configurations are also possible: 1 tuner board where 8 tuners are installed and 4 encoder boards where 2 image signals are processed at the same time; 2 tuner boards where 4 tuners are installed in 1 tuner board and 4 encoder boards where 2 image signals are processed at the same time; and 2 tuner boards where 4 tuners are installed in 1 tuner board and 2 encoder boards where 4 image signals are processed at the same time.

In addition, although 8 tuners 12 are installed in this embodiment, it is not particularly limited to this, but is possible to increase or decrease the number of tuners if necessary. As a substitute of the digital recording/reproducing devices in which 8 tuners are physically provided, the digital recording/reproducing devices in which equal to or more than 8 broadcasting waveforms can be tuned up, is also possible.

(Hard disk drive=HDD)

The HDD 17 comprises 2 HDDs, an always recording HDD 17a (a primary recording device), and a storing HDD 17b (a secondary recording device) to store the recorded program data. The always recording HDD 17a has capacity corresponding to 8 tuners described above. In other words, it enables recording for 8 days so that it is formed as the capacity is enough for TV programs with 8 tuners to be recorded.

In fact, program data can be recorded for (24-hours×8 days)×8 tuners=1,536 hours. The program data which the user wishes to store can be stored in the Storing HDD 17b, and the program data will be stored considering a bit rate when the user selects the desired program data. The program data stored here can be output to the outside recording device, the optical disk of the DVD drive 29.

In addition, although the HDD 17 has 2 HDDs physically, it is not restricted to this. For instance, an embodiment of 1 HDD where one HDD is separated by partition (another area) is possible.

Also, the HDD 17 can be extended if necessary. For instance, the extended HDD may be used as a storing HDD, a HDD for editing program data, or a working HDD at the time of recording on optical disks such as a DVD.

(Time Index)

Recording of program data on the HDD 17 adopts a link buffer method. The link buffer stands for a data configuration where a data area such as a HDD is administrated in a loop form, and the area is handed as an area with hypothetically a limitless length. That is to say, in the method, the data are recorded as one long file (program data) recorded per channel, not per program, on the always recording HDD 17a. In this embodiment, a time index is added to the program data recorded by the link buffer method.

(Time Index)

Here, "a time index" stands for an entire data where an identifier is added to the program data and the program configuration data. The time index is added on program data based on TV program lists (including newspapers and magazines) prepared by each broadcasting station in advance.

"A program configuration data" stands for data subdivided depending upon the program contents. For instance, in the case of a baseball broadcast, it shows a top of a first inning, a bottom of the first inning, a top of the second inning, a bottom of a second inning and so on. In the case of news program, it shows each section such as top news, today's special feature, weather forecast, today's fortune telling, economic news and so on. Also, commercial messages between the respective sections are also included in it. In the case of adding the time index to program data, an identifier is added to each section and each CM of program data after broadcasted.

(Remote Controller)

Next, the remote controller 50 will be described referring to FIG. 2 and FIG. 3. The remote controller 50 is a remote controller for sending remote signals relating to recording/reproducing of program data, to the digital recording/reproducing device 10 recording/reproducing the program data. Here, "a remote signal" stands for the general term of an input signal sent to the digital recording/reproducing device 10 from the remote controller 50.

The remote controller 50 comprises a power supply button 60 for sending an input signal with respect to an input and output of the power supply of TV displaying an output data of the digital recording/reproducing device 10; a program data storage button 70 for storing program data recorded by the digital recording/reproducing device 10; a program data reproducing button 80 for reproducing the recorded program data and the digital data input from the outside; a next program button 90 which can display the program data which becomes the next program data of the recorded program data on the same screen of TV; a viewing-from-start-button 100 enabling to reproduce the recorded program data from the top; and channel buttons 110a and 110b used for channel selection.

In addition, the remote controller comprises buttons necessary for using various functions of the digital recording/ reproducing device 10, such as a forward button, a rewind button, a stop button, a search button, a volume button, a input switching button, an EPG button and a menu button.

(Power Supply Button)

Figure 2:
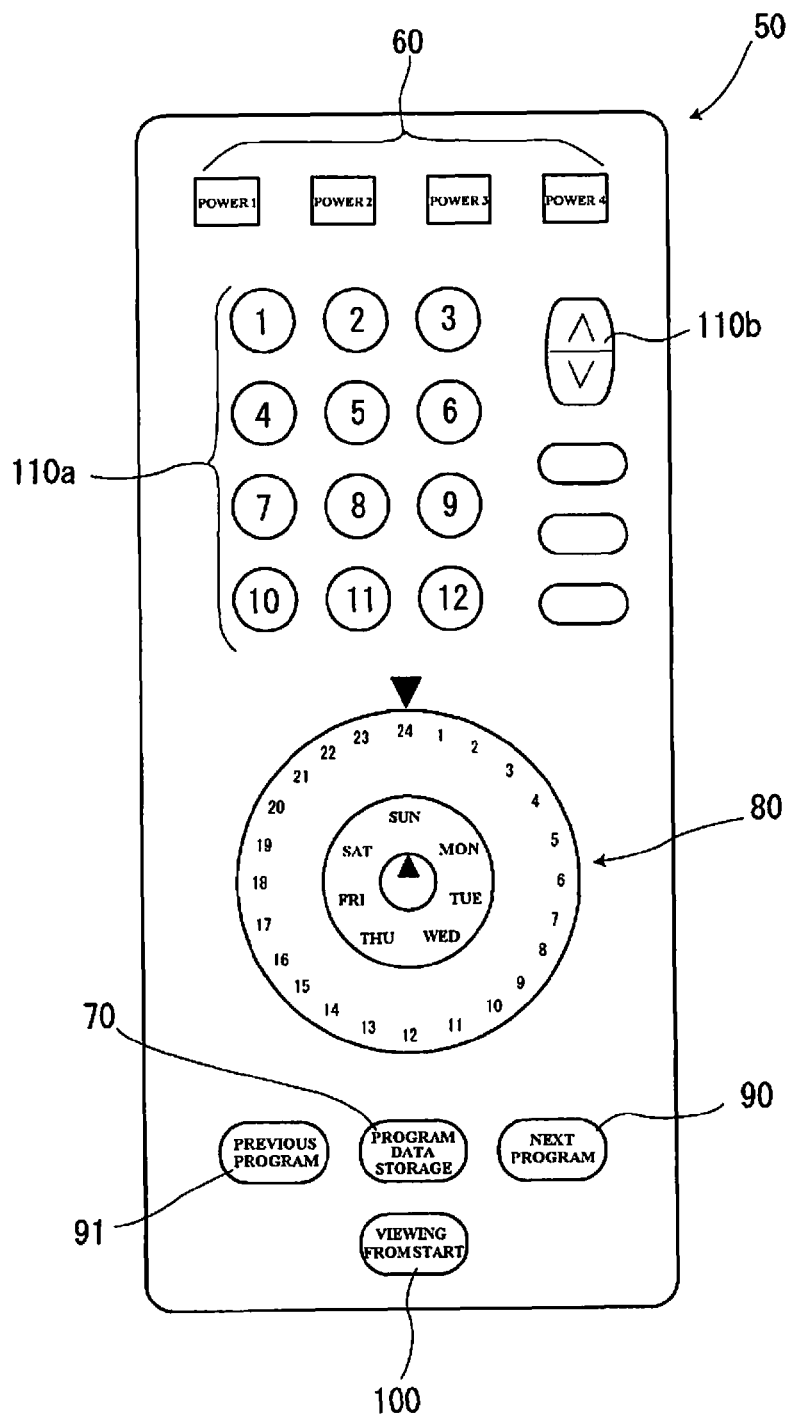
FIG. 2 is a plane view showing a configuration of the remote controller.

As shown in FIG. 2, power supply buttons 60 comprises 4 buttons of a power supply button 1—a power supply button 4. Each power supply button functions to power on/off the power supply of TV displaying output data of the digital recording/reproducing device 10. Together with that, each of the power supply buttons is accessibly associated with respective viewing data storage unit for storing a plurality of individual viewing data set by each user using the digital recording/reproducing device 10. That is, the input signal to the digital recording/reproducing device 10 is different from the input signal to the TV In addition, a preset function enables to provide TVs of different makers with power on/off function, by which TVs of a plurality of TV makers can be handled.

(Individual Viewing Data Storage Unit)

Here, "an individual viewing data storage unit" stands for a unit for storing viewing data of each user's favorite TV programs stored in the HDD17. The viewing data are like, for instance, user A views a lot of TV programs in various fields, especially education TV programs. User B mainly views news and sport programs. User C often views a series of drama and a variety programs. User D does not view any TV programs except movies. Thus, favorite TV programs generally vary for each user.

Now, in the digital recording/reproducing device 10 of this embodiment, the view data of each user are obtained, and the program data which becomes favorites of the each user are stored in the individual viewing data storage unit as individual viewing data based on the viewing data. And the individual viewing data of the user A are assigned to the power supply button 1, the individual viewing data of the user B are assigned to the power supply button 2, and in similar fashion, the individual viewing data of user C and the user D are respectively assigned to the power supply button 3 and the power supply button 4, and the TV programs which each user wishes are projected quickly by pushing the power supply buttons.

That is, since an on/off function of the TV power supply is provided, when anyone of the family members tries to power on the TV and start TV recording, reproducing and viewing, he/she only needs to push the button once, by which the power is on and his/her own top menu pops up, which results in improvement of convenience.

Further detailed description will be given referring to FIG. 4. FIG. 4 shows a TV program selection menu displayed as an individual viewing data of the user B. When the user B pushes the power supply button 2 of the remote controller 50, a power supply signal "on" is sent to the TV When the signal receiving unit 25 in the digital recording/reproducing device 10 receives the input signal, the individual viewing data storage unit of the user B is accessed, the individual viewing data are called, and then the top menu screen is displayed.

The top menu screen for the user B shows a list of programs which the user B registered as well as news and sport programs which the user B regularly views, but not other program data. Therefore, the user B may select quickly the registered program and the regularly viewing news and sport programs and such.

In addition, even if the individually assigned power supply buttons 60 are used, the user may view regular program data by returning the regular program data to a default screen. For instance, if a navigation button for displaying an EPG and such is prepared, pushing the button makes it possible the user to view other program data. However, the general users often have programs which they usually view. Therefore, it is desirable to call the program top menu screen which is the individual viewing data on an initial screen displayed when the TV is powered on. The number of the power supply buttons 60 of this embodiment is set to be 4, but it is not particularly limited to 4, and such number can be increased and decreased.

(Program Data Storage Button)

The program data storage buttons 70 is the button for storing program data recorded by the digital recording/reproducing device 10. Since the digital recording/reproducing device 10 performs always recording as previously described, this button is a storage button for storing recorded program data, not a recording button for recording TV programs. The program data stored by the program data storage button 70 is stored on the storing HDD 17b of the HDD 17. The digital recording/reproducing device 10 comprises a DVD drive (not shown in the figure) by which program data stored in the storing HDD 17b can be written on an external storage medium such as DVD-R. Other digital reproducing devices can reproduce such data.

The digital recording/reproducing device 10 has an editing function of recorded program data, which is effective to the program data stored on the storing HDD 17B. In other words, the user stores the program data which he/she wishes to keep on the storing HDD 17b once by pushing the program data storage button 70. Then, an arbitrary editing work such as a CM cut may be performed.

As described above, the digital recording/reproducing device 10 of this embodiment can reproduce the program anytime for 1 week after being recorded. However, the program data are automatically eliminated little by little when the period goes by. Therefore, for the program data storage function, the remote controller 50 comprises the program data storage button 70. Thereby, it is possible to store the program data.

(Program Data Reproducing Button)

The program data reproducing button 80 is the button for reproducing digital data input from the external storage medium such as DVD and recorded and stored program data. FIGS. 3(a) and (b) show configurations of the program data reproducing button. As shown in FIGS. 3(a) and (b), the program data reproducing button 80 comprises an outer circumferential dial 81 (a first operation unit) which can rotate in right and left directions, time marks from 1 o'clock to 24 o'clock disposed on a face of board formed in a disk shape, and an inner circumferential dial 82 (a second operation unit) which can rotate in right and left directions disposed on the an outer circumferential dial 81, the diameter being formed smaller than one of the outer circumferential dial 81, where time marks from Sunday to Saturday are disposed on a face of a board formed in a disk shape.

The program data reproducing button 80 is further provided with a reproducing determination unit 83 (reproducing determination unit) disposed on the inner circumferential dial 82 whose diameter is formed smaller than one of the inner circumferential dial 82. The inner circumferential dial 82 determines day-of-the-week-marks and the time marks designated by the outer circumferential dial 81 and the inner circumferential dial 82, and sends reproducing signals to the digital recording reproducing device 10.

Furthermore, the program data reproducing button 80 comprises a day determination unit 84 for determining the day-of-the-week-marks around the outer circumferential dial 81, and a time determination unit 85 for determining the time marks around the inner circumferential dial 82.

Figure 3:
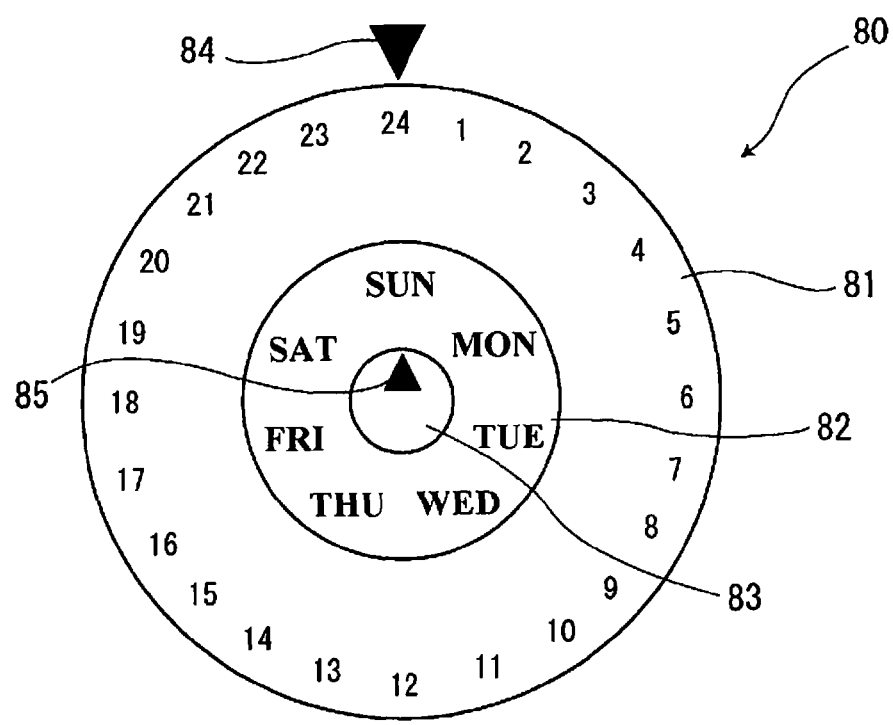
FIG. 3 is a diagram showing a structure of the program data reproducing button.
Figure 3:
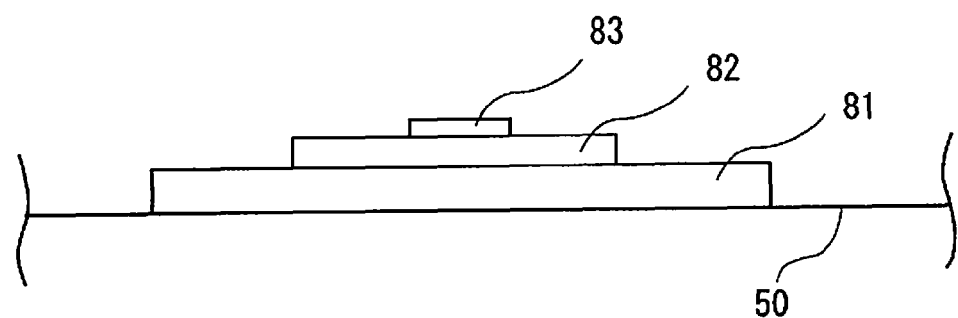

Referring to FIG. 2 and FIG. 3, an example of operation method of the program data reproducing button 80 will be described.

If a user wants to view a program starting at 21:00 on Monday evening, the user pushes channel buttons 110a or 110b at first and sets them to a desired channel, then rotates the outer circumferential dial 81 in either right or left direction, and sets a day so that the day determination unit 84 meets to "Monday." In the next place, the user rotates the inner circumferential dial 82, then sets time so that the time determination unit 85 meets to "21." After setting channel, day and time, the user pushed the determination button 83. When the determination button 83 is pushed, the designated day and time are sent to the signal receiving unit 25 of the digital recording/reproducing device 10, then the signal receiving unit 25 sends the day and time to a CPU 23 and calls the corresponding program data. The called program data are sent to the TV as an output data. Then, in the TV, the program data are displayed at 21:00 on the Monday evening in the set channel.

Other operation method will be described referring to FIG. 5.

What is shown in FIG. 5 is program data displayed on a TV screen in case a channel setting is omitted. A user pushes a determination button 83 using an outer circumferential dial 81 and an inner circumferential dial 82 in the same way as the operation method described above. Then, a group of program data to be broadcasted at 21:00 of Monday night is displayed. The user selects desired channel from the group of programs, and then pushes the determination button 83, by which viewing becomes available. In addition, the group of programs in this embodiment displays program data for 1 hour before and after the set time (here, 21 o'clock), by which improvement of visibility can be obtained.

In this embodiment, a day determination unit 84 and a time determination unit 85 are disposed facing each other, and the day and time are set under the configuration. However, the present invention is not restricted to this configuration.

Also, the determination button 83 may be provided with a function like a power supply button. In this case, the day and time are determined by the outer circumferential dial 81 and the inner circumferential dial 82, and when the determination button 83 is pushed, the program data are called and an input signal of power on is sent to the TV This improves operability and time shortening when viewing the program data.

("Next Program" Button)

The next program button 90 is the button to implement a command to reproduce the recorded program data which was broadcasted on the same day and the same channel as the present program data which the user is viewing, immediately after said present program data was broadcasted, while the user is viewing said present program data, after said present program data without changing screens.

A detail description will be given referring to FIG. 6.

Figure 6:
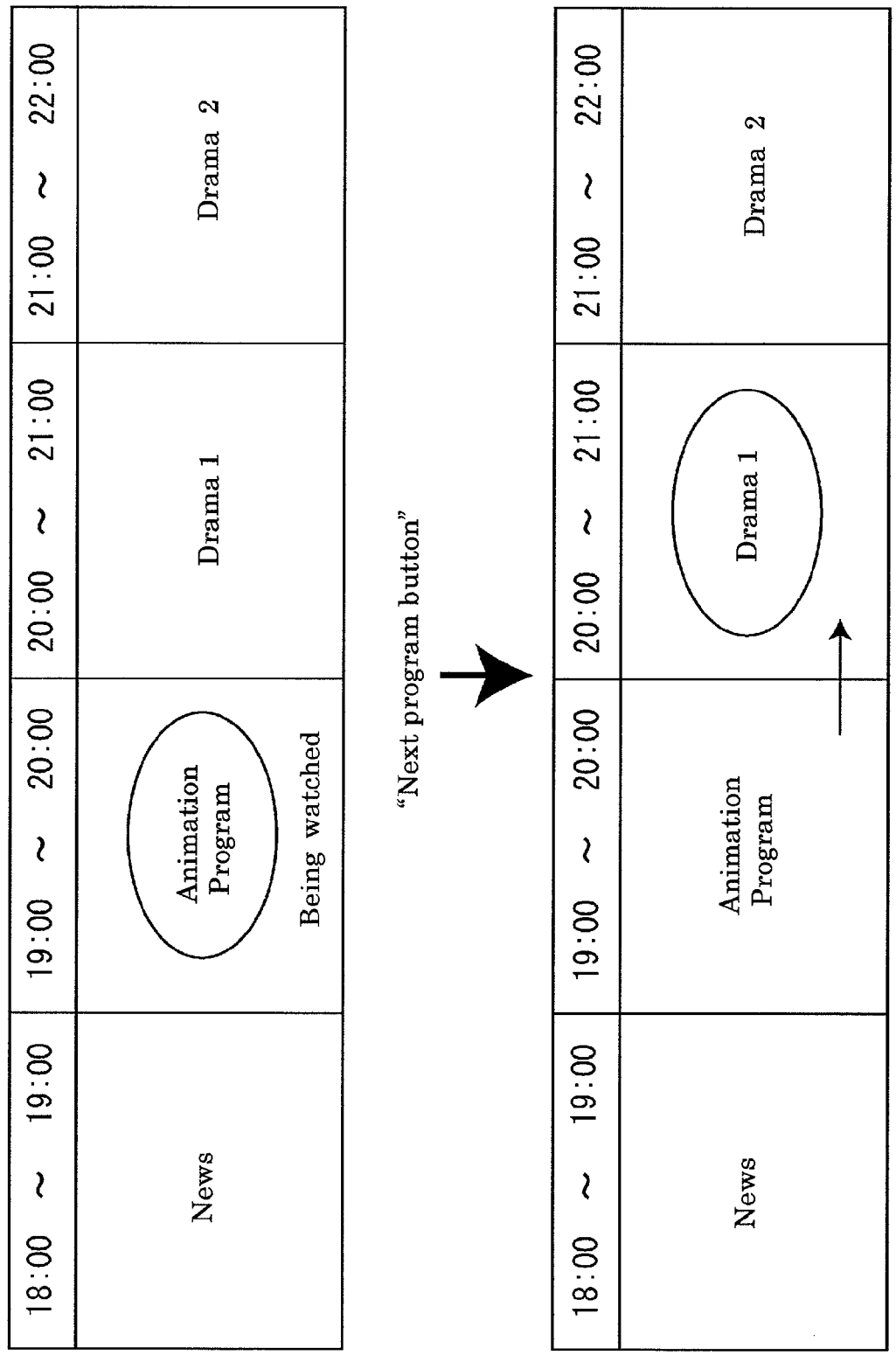
FIG. 6 is a conception diagram showing a shift form of the recording program data conceptually at the time of operating the next program button.

FIG. 6 is a conception diagram conceptually showing fashion that the program data are shifted when the next program button 90 is pushed. As shown in the figure, if a user pushes the next program button 90 while viewing the animation program broadcasted from 19:00, a drama 1 recorded between 20:00 and 21:00 will be reproduced instead of the animation program recorded between 19:00 to 20:00. The shift of program data may be performed per program data such as the animation and the drama and per program section within the program data. Furthermore, the shifted program data may be reproduced after the program which the user is viewing at present without changing screens. In addition, if the next program button is pushed twice, the drama 2 recorded between 21:00 to 21:00 will be displayed.

It becomes possible by arranging the program data in a row in a film shape and shifting the program data depending upon the input signal and the input number of which the next program button 90 is pushed. For instance, while an animation program at 19:00 is reproduced, if the next program button 90 is pushed twice, a drama 2 between 21:00 to 22:00 will be displayed.

In the conventional general technology, if a user wishes to view the recorded program data, it is necessary to switch the screen to a top menu screen for looking over a desired data program in recorded program data and selecting it from the TV screen where the program data are being projected. Then, desired program data are selected and it is returned to the TV screen. Also, after such selection is over, if the user wishes to view other program data, it is necessary to shift the screen to the layer of the top menu screen again. It causes frequent switching of screens, which is troublesome.

However, if the next program button 90 is used, only one time pushing reproduce the program data sequentially after the program data being reproduced and viewed at present without changing screens, which results in much convenience.

("Former Program" Button)

In the remote controller 50, the previous program button 91 is provided. The previous program button 91 enables a shift in an opposite direction to the next program button 90 per program data and per section. The previous program button 91 is the button to implement a command to reproduce the recorded program data which was broadcasted on the same day and the same channel as the present program data which the user is viewing, immediately before said present program data was broadcasted, while the user is viewing said present program data, after said present program data without changing screens. If the previous program button 91 is pushed, the program data which was broadcasted and recorded before the program data being reproduced at present are reproduced. In other words, the previous program button 91 is the button which operates time wise in an opposite direction to a next program button 90.

Figure 7:
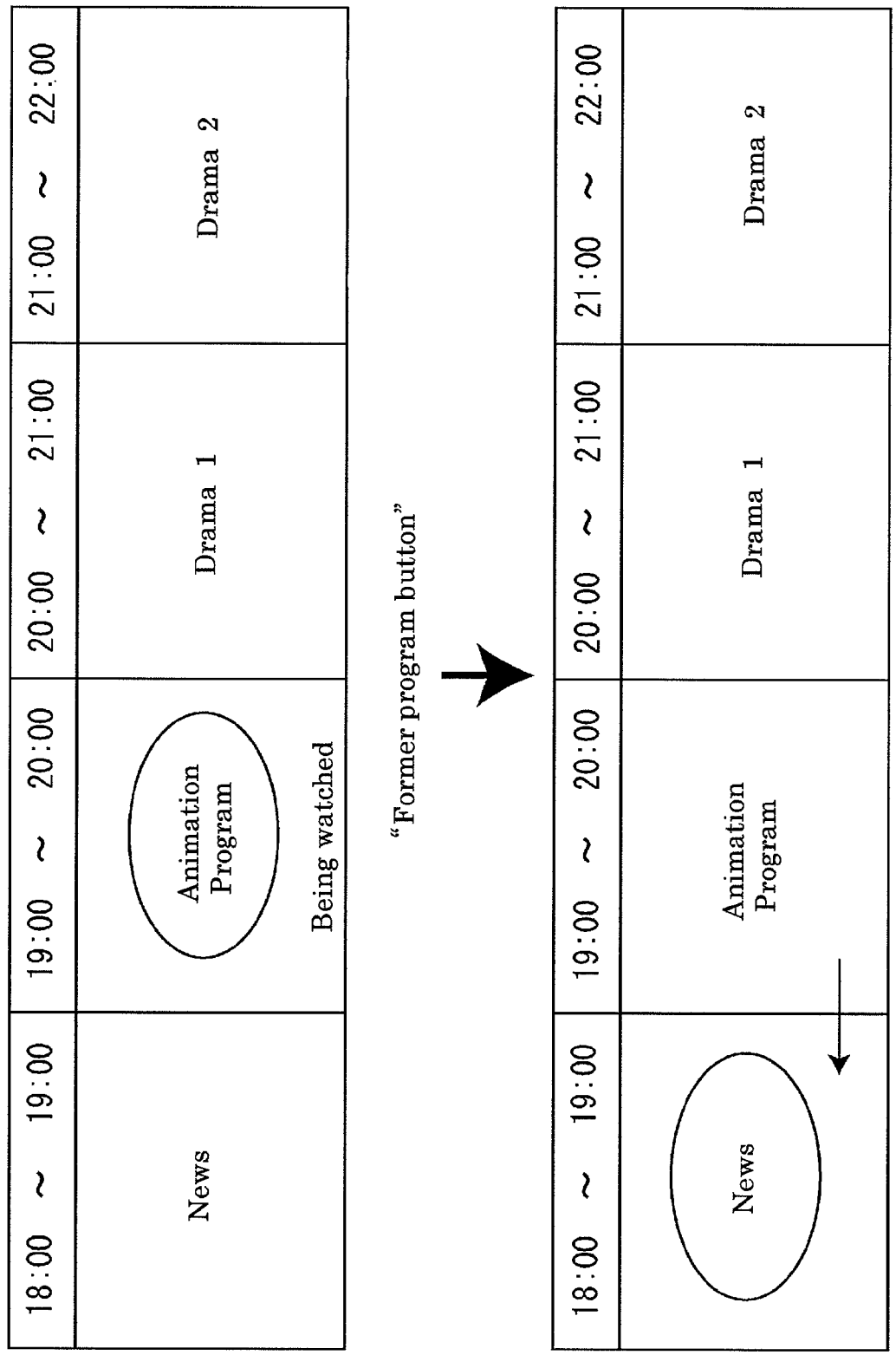
FIG. 7 is a conception diagram showing a shift form of the recording program data conceptually at the time of pushing the previous program button.

As shown in FIG. 7, if the user pushes the previous program button 91 while viewing an animation program broadcasted at 19:00, news which was recorded between 18:00 and 19:00 will be displayed instead of the animation program which was recorded between 19:00 and 20:00. Therefore, it becomes possible to shift the program being reproduced at present to the previous program without changing screens, which results in improvement of convenience at the time of viewing.

("Viewing-From-Start" Button)

The viewing-from-start-button 100 is the button for enabling to return to the top of the program data, while a user is viewing the program data in real time. When the user pushes the viewing-from-start-button 100, the digital recording/reproducing device is reproduced from the top part of the recorded program data. That is, the program being broadcasted in real time is the program data whose recording has already been finished or is being done by the digital recording/reproducing device.

That is, in the middle of real time viewing, tracing to the top of the program data occurs. Conventional technology generally comprises steps of 1) showing the recorded program list from the top menu screen, 2) looking over the program being recorded at present from the program list, and 3) selecting the chase reproducing from the OSD menu which pops up by pushing the menu, overlapped with the image on the screen. In contrast, in the present invention, pushing the viewingfrom-start-button once may start viewing from the top, causing improvement of convenience at the time of viewing.

(Second Embodiment)

Figure 8:
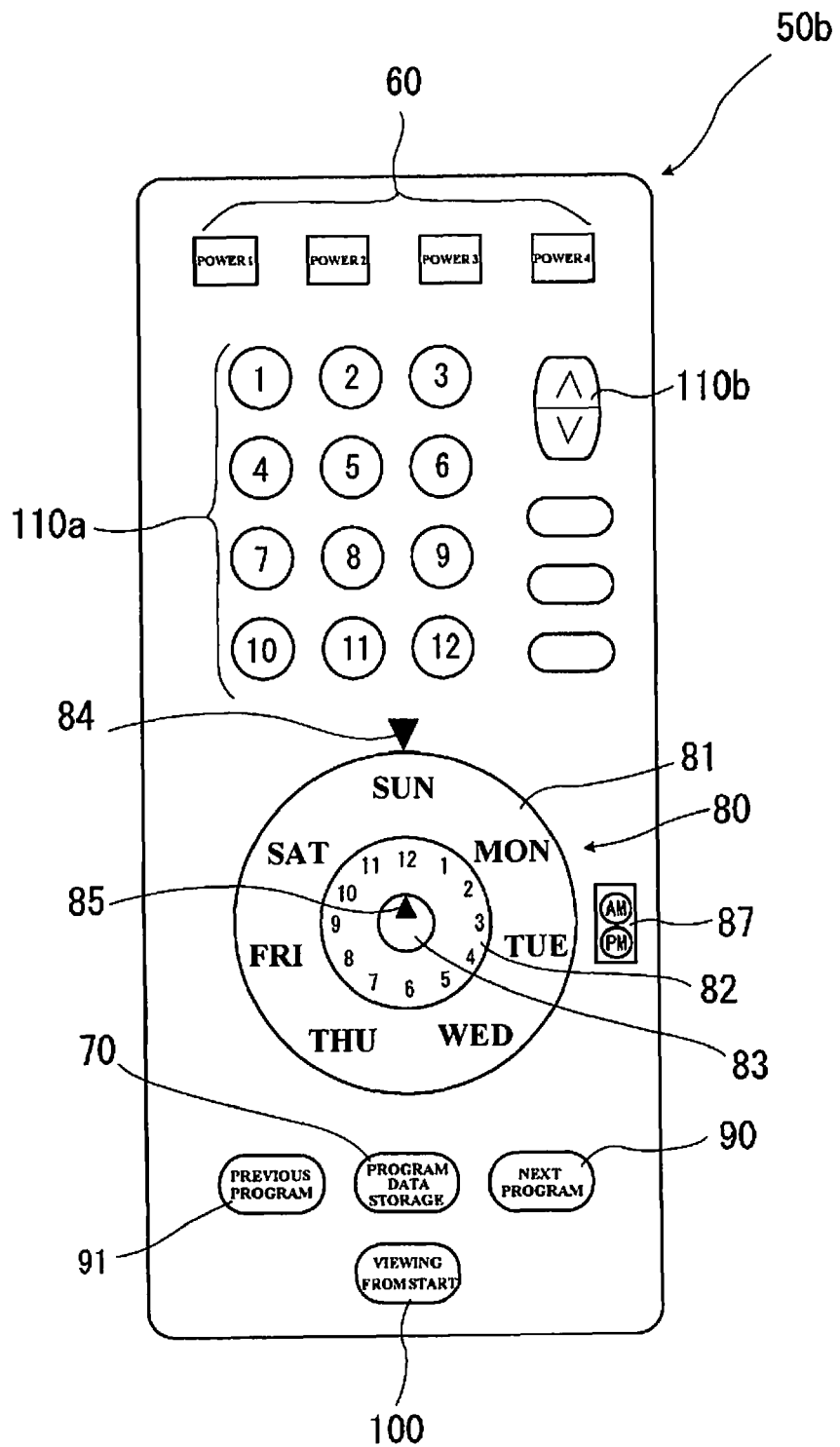
FIG. 8 is a plane view showing a structure of the remote controller in the second embodiment.

Next, the second embodiment of the present invention will be described referring to FIG. 8. The remote controller 50*b* of the second embodiment comprises a power supply button 60 for sending an on/off input signal for the power supply of the TV displaying the output data of the digital recording/reproducing device 10, and a program data reproducing button 80 for reproducing the program data, which is exactly the same as the first embodiment described above. However, layout of the day-of-the-week-marks and time marks as well as a display means of the time mark differ from those of the first embodiment.

That is, the program data reproducing button 80 comprises an outer circumferential dial 81 (the first operation unit) which can rotate in left and right directions, day-of-the-week-marks from Sunday and Saturday being disposed on a face of board formed in a disk shape, and an inner circumferential dial 82 (a second operation unit) which can rotate in right and left directions where an outer circumferential dial 81 is formed smaller than one of the outer circumferential dial 81, time marks from 1 o'clock to 12 o'clock being disposed on a face of a board formed in a disk shape.

The program data reproducing button 80 is also provided with a reproducing button 83 disposed on the an outer circumferential dial 81 whose outer diameter is formed smaller than one of the outer circumferential dial 81, which determines the day-of-the-week-marks and the time marks designated by the outer circumferential dial 81 and the inner circumferential dial 82 and sends a reproducing signal to the digital recording/reproducing device 10. Furthermore, an AM/PM button 87 is provided in order to enable a distinction between AM and PM because the time mark shows time in 12-hour.

As for an operation method, for instance if a user wants to view a program starting at 10:00 on Friday morning, the user at first rotates the outer circumference dial 81 in either left or right direction to set a day so that the day determination unit 84 meets "Friday." In the next place, the user pushes the AM button of the AMPM button 87 and rotates the inner circumferential dial 82 to set a time so that the time determination unit 85 meets "10." After setting the day and time, the user pushes the determination button 83. Because the time marks are shown in 12-hour, it is possible to shorten time for rotating the inner circumferential dial 82 and further to enlarge display of the time marks. Thereby visibility is improved.

Additionally in the present invention, the day-of-the-week-marks are disposed on the outer circumferential dial 81 and the time marks are disposed on the inner circumferential dial 82. However, they may be reversed.

(Third Embodiment)

Figure 9:
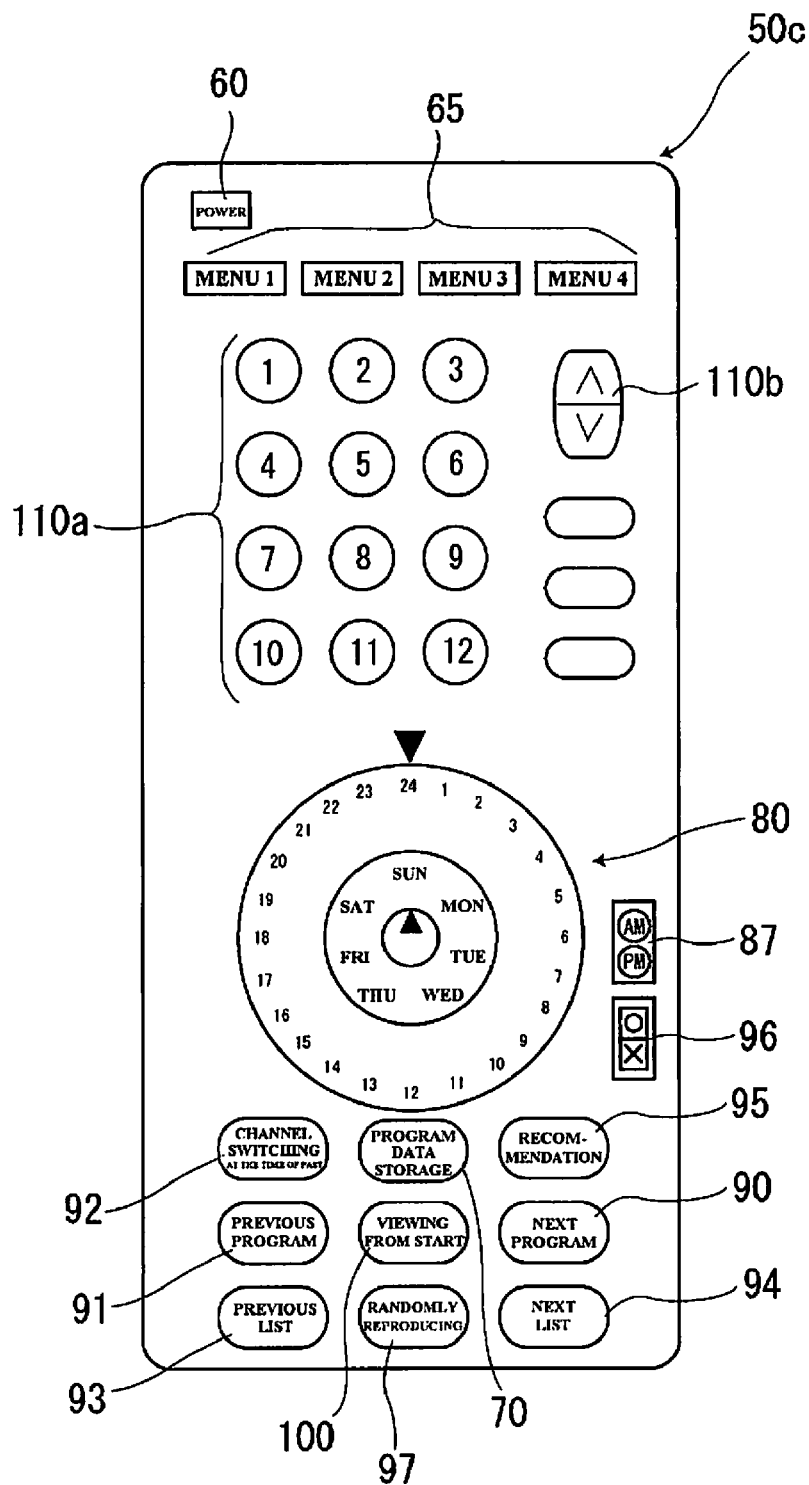
FIG. 9 is a plane view showing a structure of the remote controller in the third embodiment.

Next, the third embodiment of the present invention will be described referring to FIG. 9. The remote controller 50*c* of the third embodiment comprises the buttons for realizing various functions of the remote controllers 50, 50*b* of the first and the second embodiment, which is the same as one in the first and the second embodiments. In addition, the remote controller 50*c* of the third embodiment comprises a plurality of menu buttons 65, a channel switching-button-at-the-time-of-the-past-button (past switching) 92, a previous list button 93, a next list button 94, and a recommendation button 95.

(Menu Button)

The menu buttons 65 comprise menu buttons 1-4 for enabling identification of individuals. It is possible to assign a plurality of users using the digital recording/reproducing device 10 to each of the menu buttons, and to send a signal which can directly access the top menu screen for selecting the program data by pushing the menu button.

The user is assigned to the menu buttons and the user's favorite program data has been registered in the top menu screen in advance. The user may quickly access the top menu screen customized for one's exclusive use by pushing the assigned menu button for one's exclusive use. Therefore, in particular, when the digital recording/reproducing device 10 is used by the plurality of users as a TV recording device shared within a family member, convenience will be remarkably improved.

In the conventional general digital recording/reproducing device (a general machinery), in the case of performing an operation of the recording/reproducing, the menu is layered from the top menu. That is, the procedure necessary for reproducing the program in the general machinery requires steps of "displaying the top menu→displaying the reproducing menu→→selecting a program." However, when the reproducing menu is displayed, all playable recorded program data are displayed. Therefore it is troublesome to select the program data in which a user is interested among them. Also, in the case of separating directories per individual, as shown in "displaying top menu→displaying a reproducing menu→displaying individual menu→selecting program", one more step is added.

In contrast, in the digital recording/reproducing device 10 of the present invention, when the menu buttons 65 is pushed, the procedure becomes "setting the menu button on=displaying a menu per individual→selecting a program," by which the program data may be reproduced with very few operation. Thereby, the operation procedure at the time of viewing the program data may be simplified, causing improvement of convenience.

(Channel-Switching-at-the-Time-of-Past-Button)

The channel-switching-button-at-the-time-of-past 92 realizes a function in which the program data of other channels which was broadcasted on the same day and at the same time as ones of the present program data being reproduced and viewed at present may be reproduced successively after the present program data being reproduced and viewed at present, without changing screens while reproducing the program data.

For instance, a news program is being broadcasted on "4 ch, at 18:00 of the $10^{th}$ day", a cooking program is being broadcasted on "6 ch, at 18:00 of the $10^{th}$ day". In this case, if a user pushes the channel-switching-button-at-the time-of-past 92 while viewing the news program of "4 ch, at 18:00 of the $10^{th}$ day", the cooking program broadcasted in "6 ch, at 18:00 of the $10^{th}$ day" will be reproduced without changing screens. That is, it becomes possible to shift a program per broadcasting station broadcasted at the same time.

(Previous List/Next List Button)

The previous list button 93 and the next list button 94 realize function that when the program data is selected from a list where recorded program data are rated in a predetermined form, the program data existing in the rate immediately below and above one of the program data being reproduced and viewed may be reproduced successively after the program data being viewed at present without changing screens. In addition, both of the list buttons 93 and 94 are provided with a rating list storage area which stores information from which of the rating list the rating list being reproduced and viewed at present is selected For instance, if a user pushes the next list button 93 while reproducing the $5^{th}$ program data in the rating list where the high audience rating program of a week is rated, the $4^{th}$ rated program will be reproduced without changing screens, and if the user pushes the previous list button 84, the 6$^{th}$ rated program will be reproduced without changing screens. That is, the rated and listed program data may be viewed in turn without returning to the top menu screen. Therefore, convenience and operability when using the digital recording/reproducing device 10 is remarkably improved.

(Recommendation Button)

The recommendation button 95 realizes a function for sending the recommended program data via a network so that other users may view the program which a person views himself/herself and recommends. If a user pushes the recommendation button 95, the user may transmit his/her favorite program and the program data which he/she wishes to recommend to other users. In contrast, the user may obtain and view information relating to the program data which other users recommend.

In addition, each user evaluates each program data by the evaluation button 96 comprising "good" or "no good" buttons, thereby credibility of the evaluation and recommendation is improved.

The remote controllers 50, 50b, 50c in the first embodiment to the third embodiment may be provided with the number of remote controllers depending upon the number of users using the digital recording/reproducing device 10. That is, in the case of using the remote controllers with 4 family members, each of the 4 remote controllers may be my remote controller used by the respective family member. And the top menu screen and so on customized by each of the family members for one's exclusive use may be used to the digital recording/reproducing device 10, causing improvement of operability.

(Fourth Embodiment)

Figure 10:
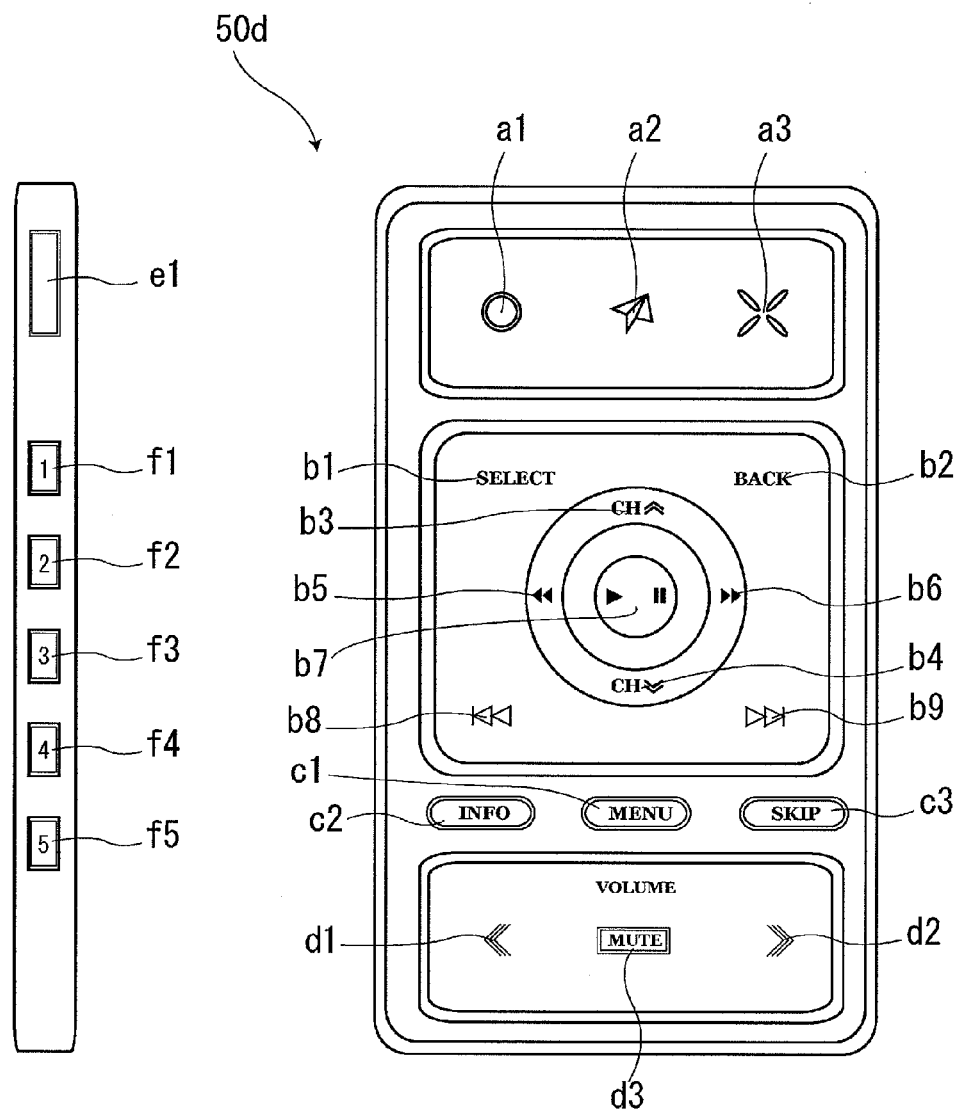
FIG. 10 a plane view showing a structure of the remote controller in the fourth embodiment.

Next, the fourth embodiment of the present invention will be described referring to FIG. 10. The remote controller 50d of the fourth embodiment is an input device which can achieve each function by the minimum number of buttons which differs from the remote controllers in the first to third embodiments.

Evaluation buttons a1-a3 are buttons for evaluating program data, program sections and so on. "Good" button a1 is pushed when evaluation is good, and "no good" button a3 is pushed when evaluation is not good. "Recommendation button" a2 realizes a function for sending a program ID, a program title, a broadcasting data and so on so that other users may view the program data which a user views oneself and wishes to recommend. This function is equivalent to the function of the recommendation button 95 previously described.

Button b1 is a "SELECT button". For instance, it is used at the time of selecting a plurality of program data and program sections. Button b2 is a "BACK button", which realizes a function to return to an upper layer in the layered menu screens, and to return to the right-before operation in another operation. Buttons b3 and b4 are "channel buttons", which are used for switching channels, and also used for selecting items in various selection screens as "a cross key top and bottom." B5 is a "rewind button" for rewinding images, which is additionally used as a "cross key left" at the time of selecting items in various selection screens. B6 is a "forward button", which is used as a "cross key left" at the time of selecting items in various selection screens.

Button b7 functions as a reproducing button of the program data, which is a "reproducing determination button" functioning as a "temporary stop button". It also functions as a determination button for determining items at the time of selecting various items in the menu screen, which corresponds to the determination button 83.

Button b8 is a "previous program button" enabling a shift per program data and section. It implements a command to reproduce the program data which was broadcasted immediately before the present program data being reproduced and viewed at present on the same date and the same channel as ones of said present program data, sequentially after said present program data, without changing screens, while reproducing the program data. It is equivalent to a function of the previous program button 91 described above.

Button c1 is a "MEMU button", which realizes a function to display various overlaid menus on the TV screen such as a menu to register the regularly-viewed program data, one to store program data, one to adjust picture quality, and one to adjust quick viewing. Button c2 is an "INFO button", which realizes a function to display the information on the program being viewed, overlaid on the screen. Button c3 is a "SKIP button" for forwarding the program being reproduced for 30 seconds.

Button d1 is a "volume down button" for performing sound adjustment, which realizes a function to lower the sound volume. Button d2 is a "volume up button", which realizes a function to raise the sound volume. Button d3 is a "MUTE button", which realizes a function to make the sound volume off temporarily.

Button e1 is a "power supply button", which realizes a function to perform on/off of the power supply of the TV Buttons f1-f5 are "buttons per individuals", which enable a plurality of users using the digital recording/reproducing device 10 to be assigned and is equivalent to a function of the menu button 65. In addition, the "power supply button" and the "individual button" are disposed on the sidepiece of the remote controller 50d.

An example of operation method by using the remote controller 50d will be described referring to FIG. 11.

FIG. 11 shows a menu screen displayed on the TV for selecting a program data which a user wishes to view from program data recorded on the digital recording/reproducing device 10. The menu screen enables a user to select a selection menu of day of the week and time by buttons b6 or b7, and to decide desired day of the week and time by button b3 or b4. After the desired day and time are selected, determination is made by pushing button b7.

Industrial Applicability

The present invention has applicability in manufacturing industry and sales industry of digital recording/reproducing devices, manufacturing industry and sales industry of the remote controllers in household electrical appliances, and service industry of providing program data, and so on.

The invention claimed is:

1. A remote controller for sending a remote signal relating to reproducing of program data to a digital recording/reproducing device comprising:
    a recommendation button configured for sending program data which a user wishes to recommend to another user,
    a previous list/next list button configured for sending a command of reproducing the program data to the digital recording/reproducing device wherein when the program data is selected from a list in which the recorded program data are rated and listed in a predetermined form, program data rated immediately below or above the rate of said selected program data are reproduced after the present program data is viewed without changing screens.

2. The remote controller as claimed in claim 1, further comprising
    a plurality of menu buttons which send selecting signals to said digital recording/reproducing device,
    wherein said menu buttons are assigned to a plurality of users using the digital/reproducing device;

wherein said selecting signals correspond to program data recorded on the digital recording/reproducing device, said program data a target for reproducing on a top menu screen of a display.

3. The remote controller according to claim 1, a power supply button for sending input signals related to on/off of a power supply of a display for displaying output data of the digital recording/reproducing device, and a program data reproducing button for reproducing the program data, the program data reproducing button comprising:
a first operation unit which can rotate in right and left directions, on the face of whose board formed like a disk time marks of 1 to 24 o'clock are disposed;
a second operation unit which can rotate in right and left directions, whose outer diameter is formed smaller than one of the first operation unit, on the face of whose board formed like a disk time marks of Sunday-Saturday are disposed; and
a reproducing determination unit disposed on the second operation unit, whose outer diameter is formed smaller than one of the second operation unit, for determining day and time data based on the day-of-the-week-marks and the time marks designated by the first operation unit and the second operation unit, and for sending a reproducing signal to the digital recording reproducing device.

4. The remote controller according to claim 1, comprising a power supply button for sending input signals related to on/off of a power supply of a display for displaying output data of the digital recording/reproducing device, and a program data reproducing button for reproducing the program data, the program data reproducing button comprising:
a first operation unit which can rotate in right and left directions, on the face of whose board formed like a disk day-of-the-week-marks of Sunday to Saturday are disposed; and
a second operation unit which can rotate in right and left directions, whose outer diameter is formed smaller than one of the first operation unit, on the face of whose board formed like a disk time marks of 1 to 12 o'clock are disposed.

5. The remote controller as claimed in claim 1, comprising a plurality of the power supply buttons, which can send on/off input signals of the power supply to the display, and send different signals to the digital recording/reproducing device depending upon each of the power supply buttons.

6. The remote controller according to claim 1, further comprising a program data storage button for sending a command to store the program data of the TV program recorded on the digital recording/reproducing device into a means for recording, wherein said means for recording is physically different from and exclusive from said digital recording/reproducing device.

7. The remote controller according to claim 1, further comprising a next program button configured for sending a command to reproduce particular program data to the digital recording/reproducing device without requiring changing screens,
wherein said particular program data had been recorded immediately after said recorded program data that a user is viewing was broadcasted and wherein said particular program data was broadcasted on the same channel as said recorded program data.

8. The remote controller according to claim 1, further comprising a previous switching button configured for sending a command to reproduce particular program data to the digital recording/reproducing device without requiring changing screens,
wherein said particular program data had been recorded immediately before said recorded program data that a user is viewing was broadcasted and wherein said particular program data was broadcasted on the same channel as said recorded program data.

9. The remote controller according to claim 1, further comprising a channel switching button configured for sending a command to reproduce particular program data to the digital recording/reproducing device without requiring changing screens,
wherein said particular program data had been recorded at the same time as said recorded program data that a user is viewing and wherein said particular program data was broadcasted on a channel different from the channel of said recorded program data.

10. The remote controller according to claim 1 comprising a viewing-from-start-button by which the program data being viewed can be returned to the top thereof.

11. The remote controller according to claim 1, comprising a randomly reproducing button for sending a command to reproduce each user's favorite program data randomly selected from the recorded program data accumulated in the individual viewing data storage unit, to the digital recording/reproducing device.

12. The remote controller according to claim 1, comprising a plurality of remote controllers which can respectively send remote control signals relating to the recording/reproducing of the program data to one of the digital recording/reproducing devices.

* * * * *